US010927760B2

(12) United States Patent
Witlicki (10) Patent No.: US 10,927,760 B2
(45) Date of Patent: Feb. 23, 2021

(54) ACTIVELY CONTROLLED CONTACTING SEAL

(71) Applicant: United Technologies Corporation, Farmington, CT (US)

(72) Inventor: Russell B. Witlicki, Wethersfield, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 76 days.

(21) Appl. No.: 16/295,105

(22) Filed: Mar. 7, 2019

(65) Prior Publication Data

US 2020/0284196 A1    Sep. 10, 2020

(51) Int. Cl.
| | |
|---|---|
| *F16J 15/16* | (2006.01) |
| *F16J 15/34* | (2006.01) |
| *F01D 25/18* | (2006.01) |
| *F02C 7/06* | (2006.01) |

(52) U.S. Cl.
CPC .............. *F02C 7/06* (2013.01); *F01D 25/183* (2013.01); *F16J 15/162* (2013.01); *F16J 15/164* (2013.01); *F16J 15/342* (2013.01)

(58) Field of Classification Search
CPC .............. F01D 25/183; F16J 15/34–346; F16J 15/3464; F16J 15/3472; F16J 15/3476
See application file for complete search history.

(56) References Cited

U.S. PATENT DOCUMENTS

| | | | |
|---|---|---|---|
| 3,491,536 A | 1/1970 | Hadaway | |
| 3,987,973 A | 10/1976 | Reinhall | |
| 4,181,474 A | 1/1980 | Shaw | |
| RE30,994 E | 7/1982 | Shaw | |
| 4,714,258 A | 12/1987 | Sauron et al. | |
| 4,928,978 A * | 5/1990 | Shaffer | F01D 25/183 277/401 |
| 10,415,707 B2 * | 9/2019 | Bidkar | F01D 25/22 |

(Continued)

FOREIGN PATENT DOCUMENTS

| | | |
|---|---|---|
| CN | 105987044 A | 10/2016 |
| DE | 1247096 B | 8/1967 |

OTHER PUBLICATIONS

European Search Report for European Application No. 19219626.9, dated Aug. 12, 2020, 6 pages.

*Primary Examiner* — Justin D Seabe (74) *Attorney, Agent, or Firm* — Cantor Colburn LLP (57) ABSTRACT

A contacting seal for a gas turbine engine includes a seal seat configured to rotate circumferentially about an axis of rotation and a seal element configured to contact the seal seat at an interface surface. The seal element is rotationally fixed relative to the axis of rotation. An actively-controlled actuation system is operably connected to the seal element to control a contact force between the seal element and the seal seat at the interface surface based on a level of lubricant flow to the interface surface. A method of operating a contacting seal includes positioning a rotationally fixed seal element in contact with a rotating seal seat at an interface surface between the seal seat and the seal element, and actively-controlling a contact pressure between the seal seat and the seal element at the interface surface utilizing an actuation system.

17 Claims, 4 Drawing Sheets

(56) References Cited

U.S. PATENT DOCUMENTS

2009/0008881 A1* 1/2009 Lee .................. F16J 15/445
                                                   277/412
2015/0123395 A1   5/2015 Weinmann
2018/0328494 A1  11/2018 Rouillon

* cited by examiner

ACTIVELY CONTROLLED CONTACTING SEAL

STATEMENT OF FEDERAL SUPPORT

This invention was made with Government support awarded by the United States. The Government has certain rights in the invention.

BACKGROUND

Exemplary embodiments of the present disclosure pertain to the art of contacting rotating seals for, for example, bearing compartments of gas turbine engines.

Bearing compartments require seals to contain the oil within the bearing compartment, which serves to lubricate the bearings contained therein. A typical seal arrangement utilizes a rotating seal seat and a rotationally stationary seal element urged into axial contact with the seal seat. The seal element is typically a carbon seal. Coil springs, wave springs, or bellows are typically utilized to urge the seal element into contact with the seal seat. Additionally, a buffer air pressure acts as an air load on the seal element and increases a closing force of the seal element on the seal seat. Friction between the seal element and the seal seat is alleviated by a flow of oil between the seal element and seal seat that lubricates the interface, while still maintaining an effective seal, a so-called "wet-face seal". Other configurations are dry-face seals in which oil flows through passages in the seal seat but does not flow to the interface.

As engines continue to push pressures higher, the bearing compartment seals become challenged. Further, when an aircraft in which the engine is installed performs maneuvers the supply of oil to the seals can be interrupted due to oil hiding and/or lack of scavenging. Oil flow interruption for more than a few seconds can result in damage to the seal element.

BRIEF DESCRIPTION

In one embodiment, a contacting seal for a gas turbine engine includes a seal seat configured to rotate circumferentially about an axis of rotation and a seal element configured to contact the seal seat at an interface surface. The seal element is rotationally fixed relative to the axis of rotation. An actively-controlled actuation system is operably connected to the seal element to control a contact force between the seal element and the seal seat at the interface surface based on a level of lubricant flow to the interface surface.

Additionally or alternatively, in this or other embodiments the actuation system includes a rotationally-stationary ramp including a plurality of ramp teeth, and a rotationally-movable ramp follower including a plurality of complimentary follower teeth meshed with the plurality of ramp teeth. Circumferential movement of the ramp follower in a first direction relative to the ramp urges the seal element toward the seal seat thereby increasing the contact force and circumferential movement of the ramp follower in a second direction opposite the first direction reduces the contact force.

Additionally or alternatively, in this or other embodiments a wave spring is positioned between the ramp follower and the seal element.

Additionally or alternatively, in this or other embodiments an actuator is operably connected to the ramp follower and is configured to urge circumferential movement of the ramp follower relative to the ramp.

Additionally or alternatively, in this or other embodiments the actuator is a hydraulic actuator.

Additionally or alternatively, in this or other embodiments one or more oil sensors are operably connected to the actuation system. The contact force is reduced when the level of lubricant flow is below a threshold.

Additionally or alternatively, in this or other embodiments the seal element is a carbon seal element.

In another embodiment, a gas turbine engine includes a rotating shaft, one or more bearing arrangements supportive of the rotating shaft, and a contacting seal configured to seal a bearing arrangement of the one or more bearing arrangements. The contacting seal includes a seal seat configured to rotate circumferentially about an axis of rotation and a seal element configured to contact the seal seat at an interface surface. The seal element is rotationally fixed relative to the axis of rotation. An actively-controlled actuation system is operably connected to the seal element to control a contact force between the seal element and the seal seat at the interface surface based on a level of lubricant flow to the interface surface.

Additionally or alternatively, in this or other embodiments the actuation system includes a rotationally-stationary ramp including a plurality of ramp teeth and a rotationally-movable ramp follower including a plurality of complimentary follower teeth meshed with the plurality of ramp teeth. Circumferential movement of the ramp follower in a first direction relative to the ramp urges the seal element toward the seal seat thereby increasing the contact force, and wherein circumferential movement of the ramp follower in a second direction opposite the first direction reduces the contact force.

Additionally or alternatively, in this or other embodiments a wave spring is positioned between the ramp follower and the seal element.

Additionally or alternatively, in this or other embodiments an actuator is operably connected to the ramp follower configured to urge circumferential movement of the ramp follower relative to the ramp.

Additionally or alternatively, in this or other embodiments the actuator is a hydraulic actuator.

Additionally or alternatively, in this or other embodiments one or more oil sensors are operably connected to the actuation system, wherein the contact force is reduced when the level of lubricant flow is below a threshold.

Additionally or alternatively, in this or other embodiments the seal element is a carbon seal element.

In yet another embodiment, a method of operating a contacting seal of a gas turbine engine includes positioning a rotationally fixed seal element in contact with a rotating seal seat at an interface surface between the seal seat and the seal element, and actively-controlling a contact pressure between the seal seat and the seal element at the interface surface utilizing an actuation system. The contact pressure is based on a level of lubricant flow to the interface surface.

Additionally or alternatively, in this or other embodiments a plurality of ramp teeth of a rotationally stationary ramp are meshed with a plurality of follower teeth of a rotationally movable ramp follower, and the ramp follower is moved in a circumferential direction relative to the ramp to adjust the contact pressure at the interface surface. Circumferential movement of the ramp follower in a first direction relative to the ramp urges the seal element toward the seal seat thereby increasing the contact force, and circumferential movement of the ramp follower in a second direction opposite the first direction reduces the contact force.

Additionally or alternatively, in this or other embodiments the seal element is biased toward the seal seat via a wave spring disposed between the seal element and the ramp follower.

Additionally or alternatively, in this or other embodiments the level of lubricant flow is directed to the interface surface via one or more oil sensors.

Additionally or alternatively, in this or other embodiments the contact force is reduced when the detected level of lubricant flow is below a preselected threshold.

Additionally or alternatively, in this or other embodiments the contact force is increased when the detected level of lubricant flow is above the preselected threshold.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
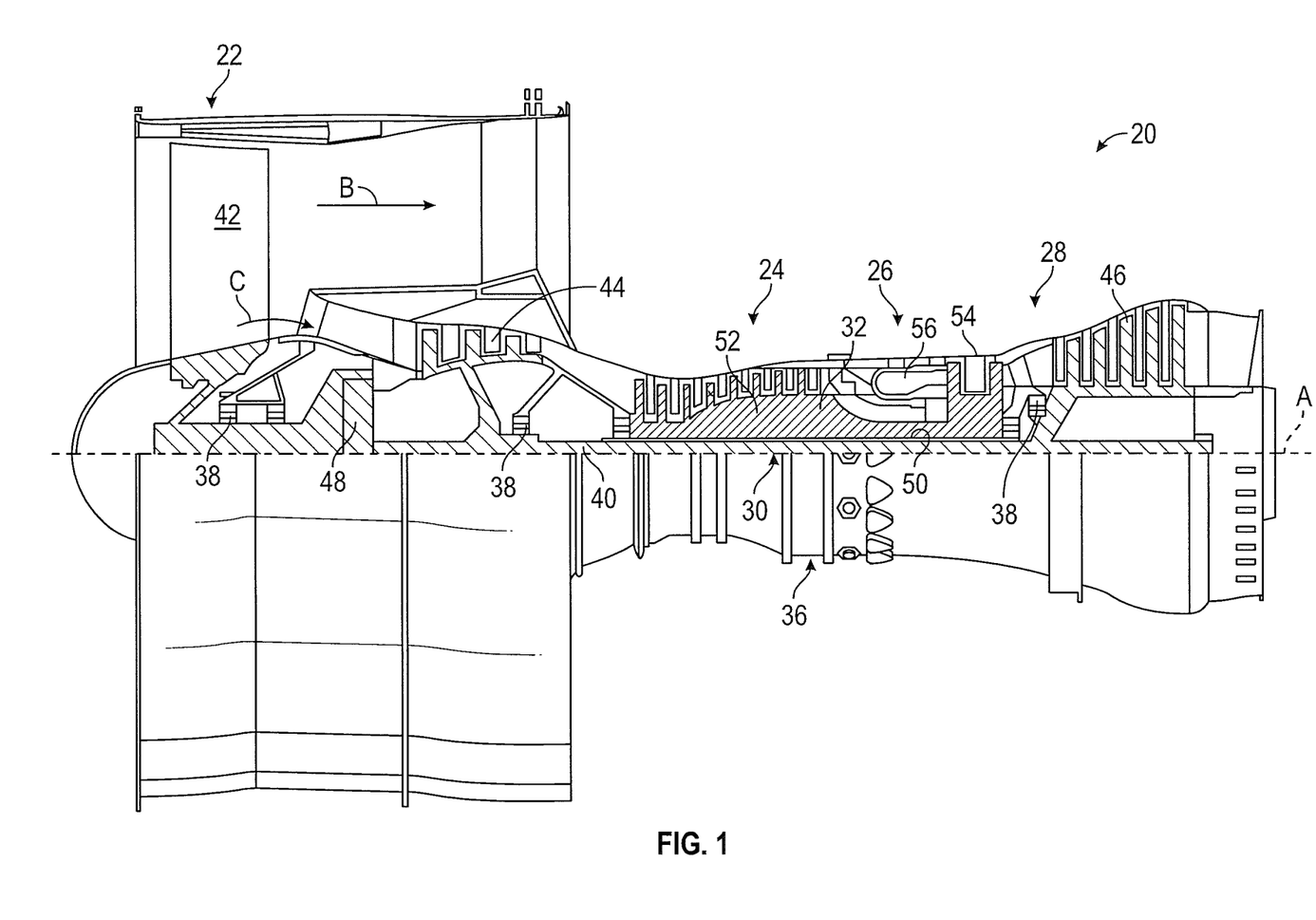
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
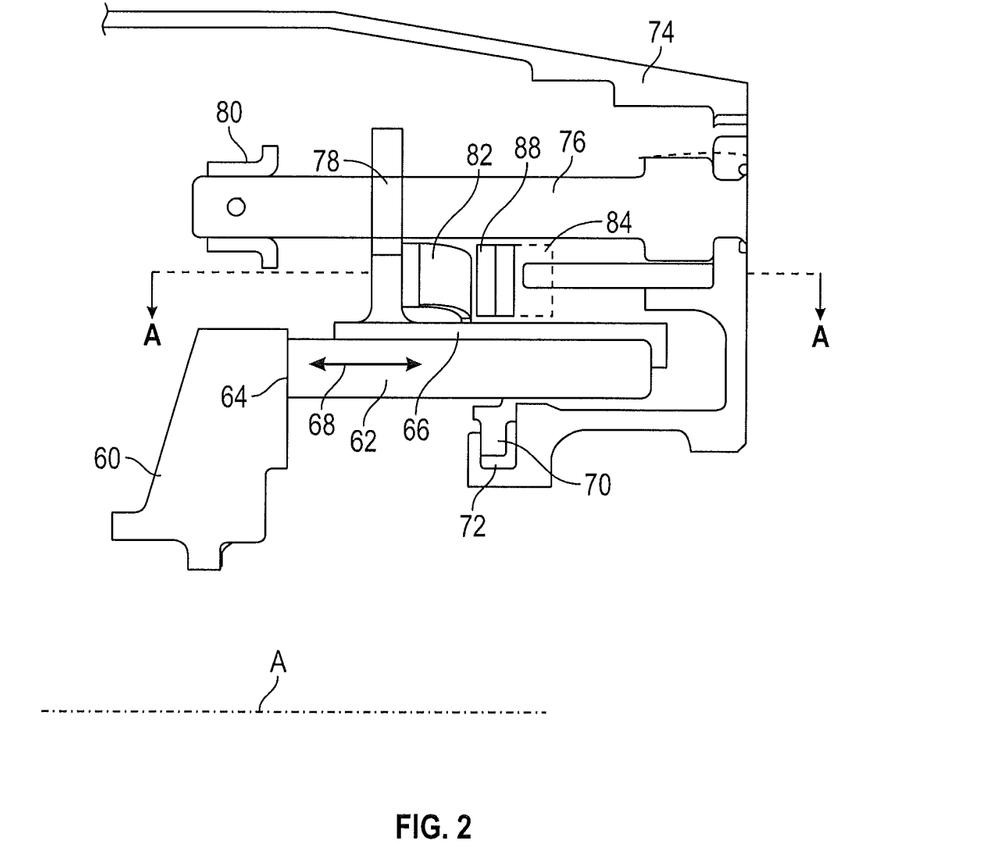
FIG. 2 is a cross-sectional view of an embodiment of a contacting seal for a gas turbine engine.

Referring now to FIG. 2, the bearing systems 38 (shown in FIG. 1) are sealed to maintain a supply of lubrication and cooling oil within the bearing systems 38, also referred to herein as a bearing compartment. The seal arrangement at the bearing system 38 includes a seal seat 60 and a seal element 62 in contact with the seal seat 60 at an interface surface 64. The seal seat 60 is operably connected to and rotates with a rotating component of the gas turbine engine 20, for example, the inner shaft 40 or the outer shaft 50. The seal element 62 is formed from, for example, carbon. The seal arrangement generates a high degree of friction, and to reduce friction and dissipate heat generated at the interface surface 64 a flow of lubricant, for example, oil, is directed through the seal seat 60 to the interface surface 64 via a plurality of oil flow channels (not shown). The seal arrangement described herein is a wet-face seal, with lubricant provided to the interface surface 64. One skilled in the art will readily appreciate, however, that the present disclosure may be readily applied to dry-face seal arrangements in which lubricant is provided through channels in the seal seat 60, but not directed to the interface surface 64.

The seal element 62 is retained in a seal carrier 66, which is movable along an axial direction 68 parallel to the engine central longitudinal axis A. The seal carrier 66 is circumferentially retained by one or more anti-rotation guides 76 secured to the static structure 74. The anti-rotation guide 76 extends axially though an anti-rotation opening 78 in the seal carrier 66. The anti-rotation guide 76 may further include an anti-rotation stop 80 at an axial end of the anti-rotation guide 76. In some embodiments, a secondary seal 70 extends between the static structure 74 and the seal element 62, with the seal element 62 translatable along the axial direction 68 relative to the secondary seal 70. In some embodiments, the secondary seal 70 is retained in a seal groove 72 in the static structure 74.

The position of the seal element 62 relative to the seal seat 60 is actively controlled such that a contact force between the seal element 62 and the seal seat 60 at the interface surface 64 may be selectably varied. For example, when there is sufficient lubricant flow to the interface surface 64 the seal element 62 may be moved so that the contact force is relatively high, but when the flow of lubricant to the interface surface 64 is below a threshold the seal element 62 is moved axially away from the seal seat 60 to reduce the contact force thus reducing damage to the seal element 62 until sufficient oil flow to the interface surface 64 is restored. To actively control the position of the seal element 62 relative to the seal seat 60, the seal arrangement includes a wave spring 82, a ramp 84 and a ramp follower 88, as will be described in further detail below with reference to FIG. 3.

Figure 3:
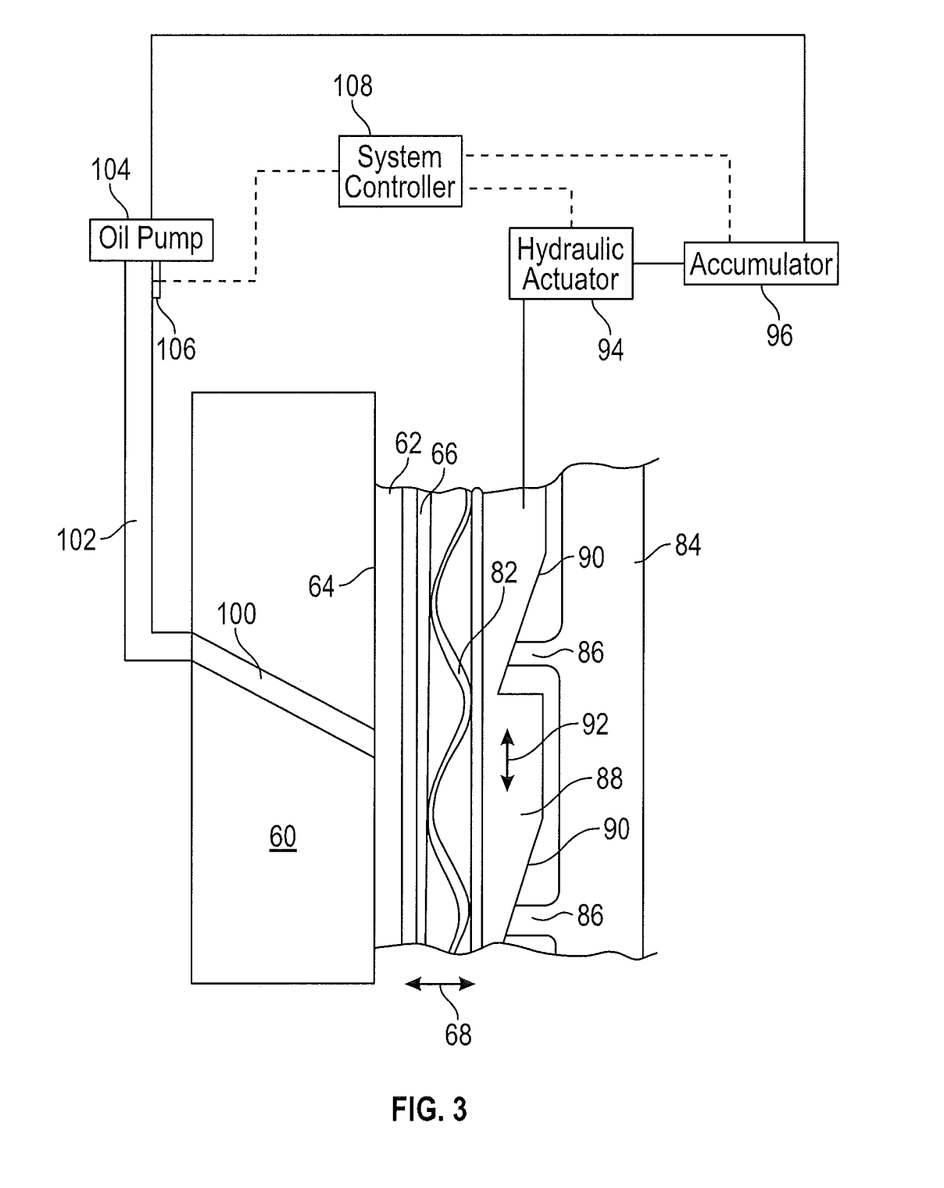
FIG. 3 is another cross-sectional view of an embodiment of a contacting seal for a gas turbine engine along section A-A of FIG. 2.

Referring now to FIG. 3, illustrated is a schematic view of an actively-controlled actuation system for a seal element 62. The wave spring 82 abuts the seal carrier 66 and applies an axial force on the seal carrier 66 to urge the seal element 62 into contact with the seal seat 60. The axial force applied by the wave spring 82 varies through the use of a ramp and ramp follower arrangement located at the wave spring 82 opposite the seal carrier 66. The rotationally stationary ramp 84 includes a plurality of circumferentially-spaced ramp teeth 86. In some embodiments, the ramp 84 is a full circumferential ring. In other embodiments, the ramp may comprise a plurality of circumferential ramp segments. The ramp follower 88 is disposed axially between the ramp 84 and the wave spring 82. The ramp follower 88 includes a plurality of complimentary follower teeth 90. Each follower tooth 90 of the plurality of follower teeth 90 meshes with a ramp tooth 86 of the plurality of ramp teeth 86. The ramp follower 88 is movable in the circumferential direction 92.

Moving the ramp follower 88 in the first circumferential direction 92, downward on the page as shown in FIG. 3, causes the plurality of follower teeth 90 to ride up their respective ramp teeth 86, thereby resulting in axial movement of the ramp follower 88 toward the seal seat 60. This movement urges the wave spring 82 to exert increased axial force on the seal carrier 66, thus increasing the contact force between the seal seat 60 and the seal element 62 at the interface surface 64. Conversely, moving the ramp follower 88 in the second circumferential direction 92, upward on the page as shown in FIG. 3, causes the plurality of follower teeth 90 to ride down their respective ramp teeth 86, thereby resulting in axial movement of the ramp follower 88 away from the seal seat 60. This movement relaxes the wave spring 82, thus reducing the contact force between the seal seat 60 and the seal element 62 at the interface surface 64.

The position of the ramp follower 88 is actively controlled via, for example, a hydraulic actuator 94. The hydraulic actuator 94 is operably connected to the ramp follower 88 to urge circumferential motion of the ramp follower 88. The hydraulic actuator 94 utilizes a flow of hydraulic fluid from, for example, an accumulator 96, urged to and/or from the hydraulic actuator 94 by the engine oil pump 104 as shown in FIG. 3. While a hydraulic actuator 94 is described herein to drive motion of the ramp follower 88, it is to be appreciated that in other embodiments other types of actuators such as, for example, electromechanical actuators may be used.

Figure 4:
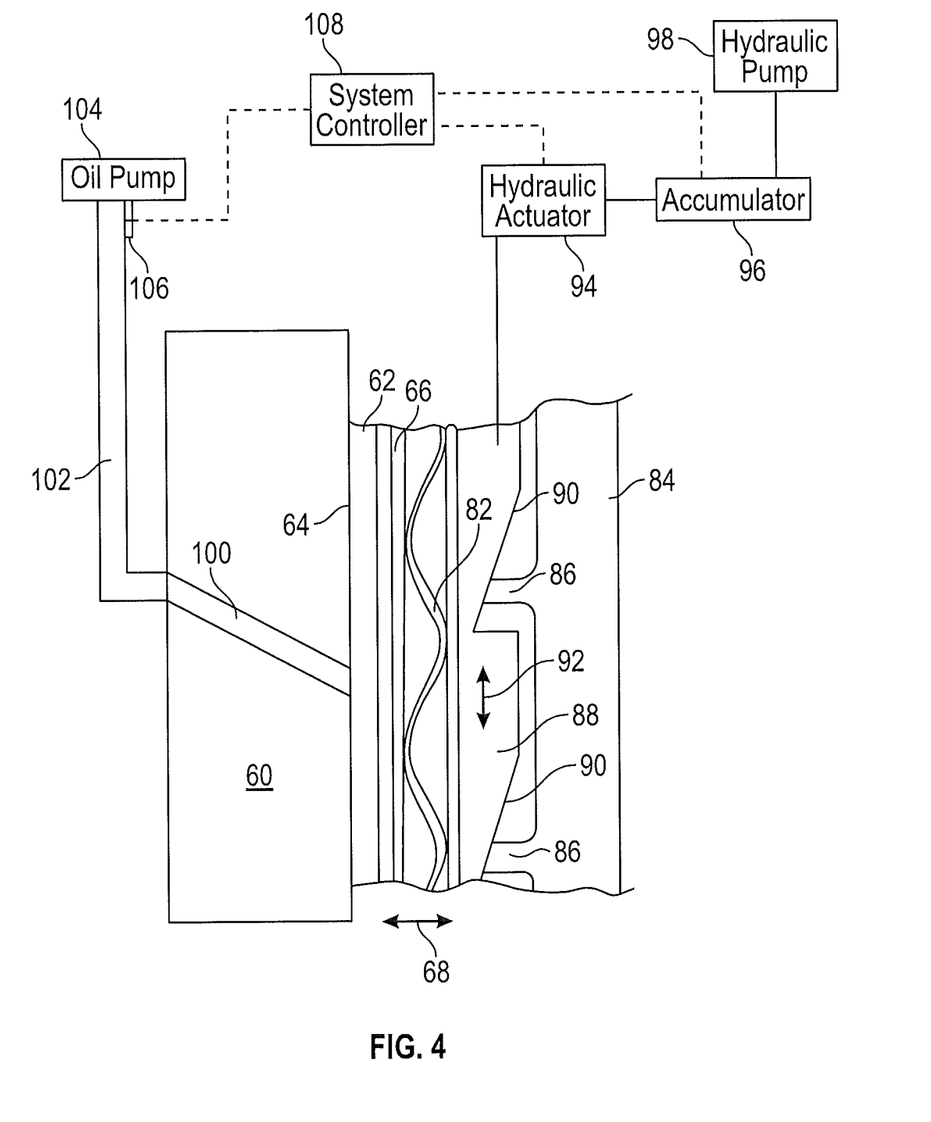
FIG. 4 is yet another cross-sectional view of an embodiment of a contacting seal for a gas turbine engine along section A-A of FIG. 2.

In another embodiment, as illustrated in FIG. 4, the hydraulic actuator 94 is operably connected to the ramp follower 88 to urge circumferential motion of the ramp follower 88. The hydraulic actuator 94 utilizes a flow of hydraulic fluid from, for example, an accumulator 96, urged to and/or from the hydraulic actuator 94 by a separate hydraulic pump 98.

A flow of oil is urged through one or more oil flow channels 100 in the seal seat 60 to the interface surface 64. The oil flow channels 100 are supplied with the flow of oil through one or more oil lines 102 connected to an oil pump 104. In some embodiments one or more oil sensors 106 are disposed at the oil pump 104 or along the one or more oil lines 102 to detect the flow of oil therethrough. The oil sensors 106 may be, for example, oil pressure sensors. The oil sensors 106 and the hydraulic actuator 94 and/or the hydraulic pump 98 are connected to a system controller 108. When the oil sensor 106 detects a flow of oil below a preselected threshold, for example, an oil pressure below a pressure threshold, the system controller 108 commands the hydraulic actuator 94 to move the ramp follower 88 in the second circumferential direction 92, upward on the page as shown in FIG. 3, causing the plurality of follower teeth 90 to ride down their respective ramp teeth 86, thereby resulting in axial movement of the ramp follower 88 away from the seal seat 60. This movement relaxes the wave spring 82, thus reducing the contact force between the seal seat 60 and the seal element 62 at the interface surface 64. This reduces the potential for damage to the seal element 62 and/or the seal seat 60 due to high friction conditions due to the reduced oil flow.

When the oil sensor 106 detects that the oil pressure has returned to above the threshold the system control 108 commands the hydraulic actuator 94 to move ramp follower 88 in the first circumferential direction 92, downward on the page as shown in FIG. 3, causing the plurality of follower teeth 90 to ride up their respective ramp teeth 86, thereby resulting in axial movement of the ramp follower 88 toward the seal seat 60. This movement urges the wave spring 82 to exert increased axial force on the seal carrier 66, thus increasing the contact force between the seal seat 60 and the seal element 62 at the interface surface 64.

The seal element 62 position control system and method disclosed herein reduces friction and heat generation at the interface surface 64 thereby reducing damage due to oil flow interruption. This reduces damage to the seals during such events and thereby extends the service life of the seal elements 62 and or the seal seats 60.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A contacting seal for a gas turbine engine, comprising:
   a seal seat configured to rotate circumferentially about an axis of rotation;
   a seal element configured to contact the seal seat at an interface surface, the seal element rotationally fixed relative to the axis of rotation; and
   an actively-controlled actuation system operably connected to the seal element to control a contact force between the seal element and the seal seat at the interface surface based on a level of lubricant flow to the interface surface;
   wherein the actuation system includes:
      a rotationally-stationary ramp including a plurality of ramp teeth;
      a rotationally-movable ramp follower including a plurality of complimentary follower teeth meshed with the plurality of ramp teeth;
      wherein circumferential movement of the ramp follower in a first direction relative to the ramp urges the seal element toward the seal seat thereby increasing the contact force; and
      wherein circumferential movement of the ramp follower in a second direction opposite the first direction reduces the contact force.

2. The contacting seal of claim 1, further comprising a wave spring disposed between the ramp follower and the seal element.

3. The contacting seal of claim 1, further comprising an actuator operably connected to the ramp follower configured to urge circumferential movement of the ramp follower relative to the ramp.

4. The contacting seal of claim 3, wherein the actuator is a hydraulic actuator.

5. The contacting seal of claim 1, further comprising one or more oil sensors operably connected to the actuation system, wherein the contact force is reduced when the level of lubricant flow is below a threshold.

6. The contacting seal of claim 1, wherein the seal element is a carbon seal element.

7. A gas turbine engine, comprising:
   a rotating shaft;
   one or more bearing arrangements supportive of the rotating shaft; and
   a contacting seal configured to seal a bearing arrangement of the one or more bearing arrangements, the contacting seal including:
      a seal seat configured to rotate circumferentially about an axis of rotation;
      a seal element configured to contact the seal seat at an interface surface, the seal element rotationally fixed relative to the axis of rotation; and
      an actively-controlled actuation system operably connected to the seal element to control a contact force between the seal element and the seal seat at the interface surface based on a level of lubricant flow to the interface surface;
   wherein the actuation system includes:
      a rotationally-stationary ramp including a plurality of ramp teeth;
      a rotationally-movable ramp follower including a plurality of complimentary follower teeth meshed with the plurality of ramp teeth;
      wherein circumferential movement of the ramp follower in a first direction relative to the ramp urges the seal element toward the seal seat thereby increasing the contact force; and
      wherein circumferential movement of the ramp follower in a second direction opposite the first direction reduces the contact force.

8. The gas turbine engine of claim 7, further comprising a wave spring disposed between the ramp follower and the seal element.

9. The gas turbine engine of claim 7, further comprising an actuator operably connected to the ramp follower configured to urge circumferential movement of the ramp follower relative to the ramp.

10. The gas turbine engine of claim 9, wherein the actuator is a hydraulic actuator.

11. The gas turbine engine of claim 7, further comprising one or more oil sensors operably connected to the actuation system, wherein the contact force is reduced when the level of lubricant flow is below a threshold.

12. The gas turbine engine of claim 7, wherein the seal element is a carbon seal element.

13. A method of operating a contacting seal of a gas turbine engine, comprising:
   positioning a rotationally fixed seal element in contact with a rotating seal seat at an interface surface between the seal seat and the seal element; and
   actively-controlling a contact pressure between the seal seat and the seal element at the interface surface utilizing an actuation system, the contact pressure based on a level of lubricant flow to the interface surface;

meshing a plurality of ramp teeth of a rotationally stationary ramp with a plurality of follower teeth of a rotationally movable ramp follower; and moving the ramp follower in a circumferential direction relative to the ramp to adjust the contact pressure at the interface surface;

wherein circumferential movement of the ramp follower in a first direction relative to the ramp urges the seal element toward the seal seat thereby increasing the contact force; and wherein circumferential movement of the ramp follower in a second direction opposite the first direction reduces the contact force.

14. The method of claim 13, further comprising biasing the seal element toward the seal seat via a wave spring disposed between the seal element and the ramp follower.

15. The method of claim 13, further comprising detecting the level of lubricant flow to the interface surface via one or more oil sensors.

16. The method of claim 15, further comprising reducing the contact force when the detected level of lubricant flow is below a preselected threshold.

17. The method of claim 16, further comprising increasing the contact force when the detected level of lubricant flow is above the preselected threshold.

* * * * *